Patented Mar. 19, 1940

2,194,423

UNITED STATES PATENT OFFICE 2,194,423

ORGANIC BLACK PIGMENT

George M. Friese, Plainfield, N. J., assignor, by mesne assignments, to American Cyanamid Company, New York, N. Y., a corporation of Maine No Drawing. Application September 3, 1938, Serial No. 228,397

8 Claims. (Cl. 260—267)

This invention relates to black organic pigments which are useful for coloring cellulose acetate solutions, lacquers, plastics, paints, inks, emulsions for textile printing, and the like.

According to the present invention, spirit-soluble colors obtained by the fusion of aniline with nitrogenous benzene compounds such as, for example, unsulfonated nigrosines, indulines, and the like, are oxidized to form black pigments of unknown chemical composition. These black pigments on dilution give true grays instead of a brown as in the case of carbon black. They have good fasteness to light, washing, drycleaning, acid and alkalies. They are practically insoluble in acetone, alcohols and hydrocarbons, and do not change the viscosity of lacquers. The black pigments are suitable for all ordinary pigment uses such as, for example, coloring cellulose acetate solutions prior to forming threads, incorporation in lacquers, plastics, paints, inks, and the like, and particularly for incorporation in resin emulsions for textile printing.

The pigments of the present invention may be obtained by treating the base with strong nitric acid or with other oxidizing agents such as manganese dioxide in acid solution. It is practically certain that in all cases oxidation takes place, and it is possible that when nitric acid is used, there may be some nitration. The products obtained are of such high molecular weight that their constitution has not been determined and it is not even certain that they are chemically completely homogeneous. The present invention is therefore not limited to any particular theory of structure of the compounds which form the black pigments.

The invention will be described in greater detail in conjunction with the following specific examples in which the parts are by weight.

Example 1

To 250 parts of 99% sulfuric acid are added 113 parts of unsulfonated nigrosine (made from the fusion of nitrobenzene, aniline salt and aniline) while keeping the temperature below 30° C. As soon as all the nigrosine is dissolved, it is cooled to about 20° C. and 100 parts of mixed acid containing 28% nitric acid and 68% sulfuric acid are slowly added while allowing the reaction mass to gradually rise to 55° C. when the last of the mixed acid has entered. It is stirred for 15 minutes and then poured into water, filtered and washed.

The product is a black pigment which dilutes to a gray tone and which is insoluble in water and substantially insoluble in acetone, alcohols and hydrocarbons.

Example 2

To 400 parts of 99% sulfuric acid are added 113 parts of unsulfonated nigrosine as described in Example 1, while keeping the temperature below 30° C. As soon as all the nigrosine is dissolved, it is cooled to 20° C. and 42 parts of 94.6% $MnO_2$ manganese dioxide are slowly added while allowing the reaction mass to gradually rise to 55° C. when the last of the manganese dioxide has entered. It is stirred for 15 minutes and then poured into water, filtered and washed.

The product is a black pigment which dilutes to a gray tone and which is insoluble in water and substantially insoluble in acetone, alcohols and hydrocarbons.

Example 3

To 250 parts of 99% sulfuric acid are added 113 parts of induline base (made from the fusion of aminoazobenzene, aniline salt and aniline) while keeping the temperature below 30° C. As soon as all the induline base is dissolved, it is cooled to about 20° C. and 100 parts of mixed acid containing 28% nitric acid and 68% sulfuric acid are slowly added while allowing the reaction mass to gradually rise to 55° C. when the last of the mixed acid has entered. It is stirred for 15 minutes and then poured into water, filtered and washed.

The product is a black pigment which dilutes to a gray tone and which is insoluble in water, and substantially insoluble in acetone, alcohols and hydrocarbons.

What I claim is:

1. A black organic pigment obtained by oxidizing a compound included in the group consisting of unsulfonated nigrosines and indulines with an oxidizing agent of substantially the strength of manganese dioxide and nitric acid, the pigment being further characterized by the property of dilution with white to form a pure gray.

2. A black organic pigment obtained by the oxidation of an unsulfonated nigrosine with an oxidizing agent of substantially the strength of manganese dioxide and nitric acid, the pigment being further characterized by the property of dilution with white to form a pure gray.

3. A black organic pigment obtained by the oxidation of an unsulfonated induline with an oxidizing agent of substantially the strength of manganese dioxide and nitric acid, the pigment being further characterized by the property of dilution with white to form a pure gray.

4. A black organic pigment obtained by the oxidation of unsulfonated nigrosine made from the fusion of nitrobenzene, aniline salt and aniline with an oxidizing agent of substantially the strength of manganese dioxide and nitric acid, the pigment being further characterized by the property of dilution with white to form a pure gray.

5. A method of preparing a black organic pigment which comprises oxidizing a member of the group consisting of unsulfonated nigrosines and indulines with an oxidizing agent of substantially the strength of manganese dioxide and nitric acid, the pigment being further characterized by the property of dilution with white to form a pure gray.

6. A method of preparing a black organic pigment which comprises oxidizing an unsulfonated nigrosine with an oxidizing agent of substantially the strength of manganese dioxide and nitric acid, the pigment being further characterized by the property of dilution with white to form a pure gray.

7. A method of preparing a black organic pigment which comprises oxidizing an unsulfonated induline with an oxidizing agent of substantially the strength of manganese dioxide and nitric acid, the pigment being further characterized by the property of dilution with white to form a pure gray.

8. A method of preparing a black organic pigment which comprises oxidizing an unsulfonated nigrosine made from the fusion of nitrobenzene, aniline salt and aniline with an oxidizing agent of substantially the strength of manganese dioxide and nitric acid, the pigment being further characterized by the property of dilution with white to form a pure gray.

GEORGE M. FRIESE.